Patented Nov. 3, 1925.

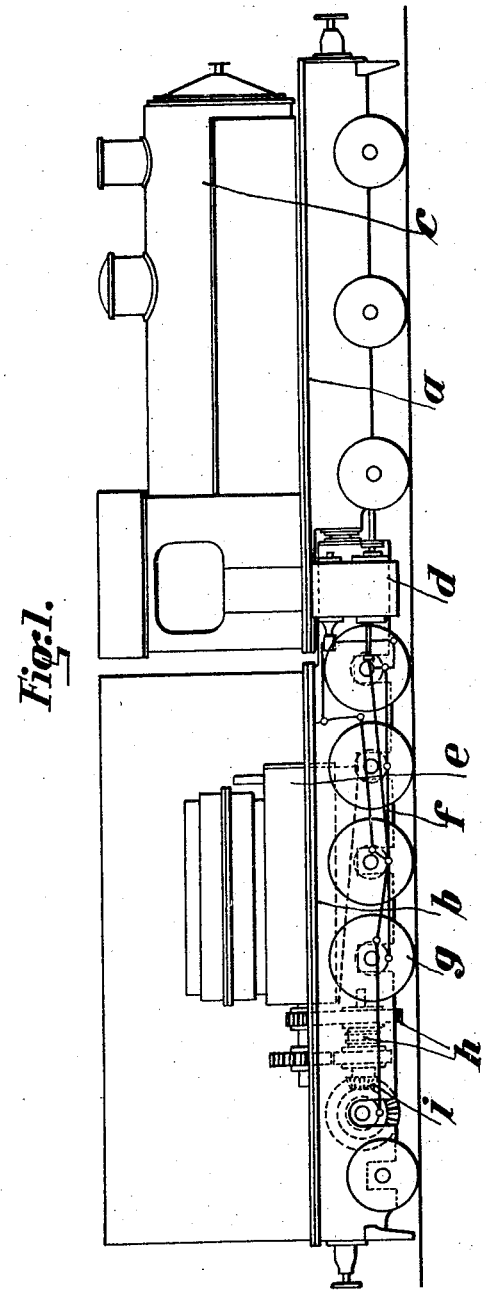

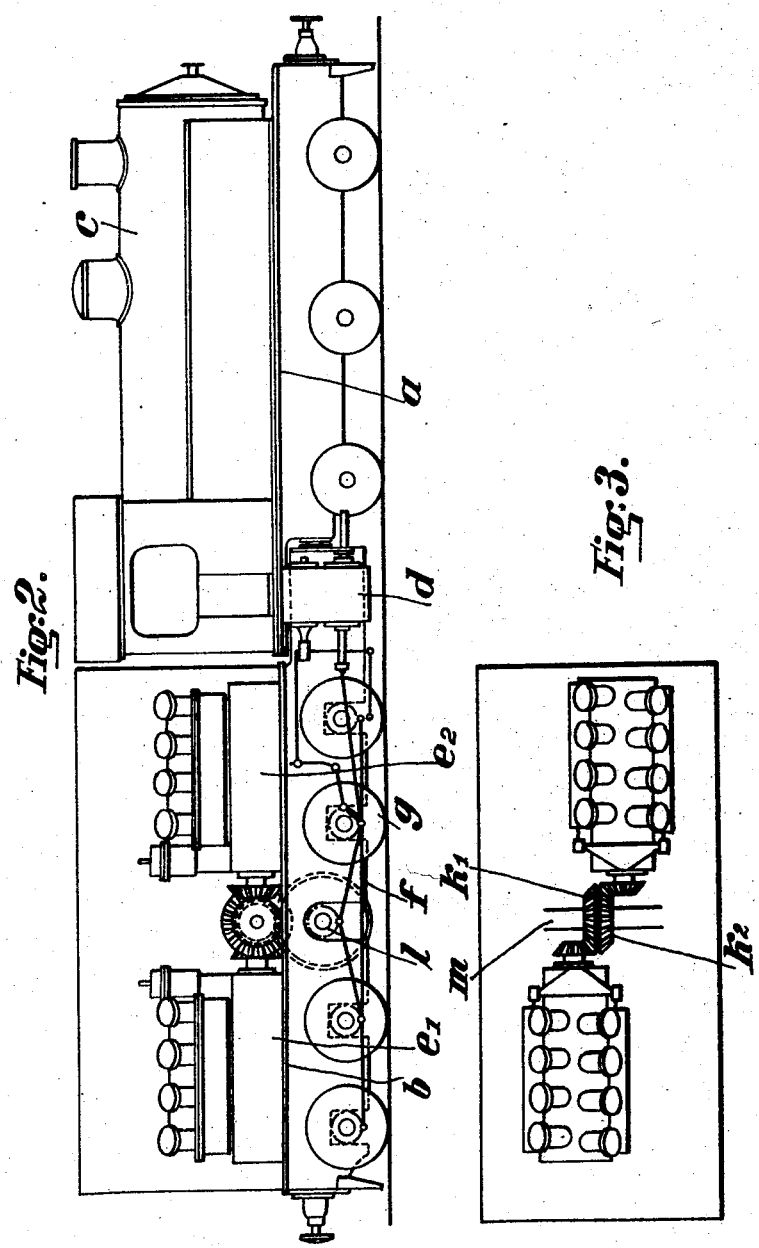

1,559,548

UNITED STATES PATENT OFFICE.

JACOB BUCHLI, OF WINTERTHUR, SWITZERLAND.

COMBINED STEAM AND INTERNAL-COMBUSTION ENGINE LOCOMOTIVE.

Application filed December 4, 1924. Serial No. 753,774.

*To all whom it may concern:*

Be it known that I, JACOB BUCHLI, a citizen of Switzerland, residing at Winterthur, Switzerland, Zürcherstrasse 64, have invented certain new and useful Improvements in or Relating to Combined Steam and Internal-Combustion Engine Locomotives, of which the following is a specification.

This invention relates to combined steam and internal combustion engine locomotives. In such locomotives the steam engine is used for starting purposes and the internal combustion engine for continuous running and hitherto it has been proposed to form each engine together with its transmission gear as a separate vehicle unit and to couple the two vehicles together. Such an arrangement however entails two separate power transmission mechanisms and the weight and adhesion of each unit has to be sufficient for the full tractive power.

To overcome that drawback it has further been proposed to employ the total weight and adhesion of each vehicle unit for starting purposes and to that end proposals have been made to couple some of the cylinders on the steam driven unit by connecting rods to the driving wheels of the internal combustion vehicle unit or truck. In either case however far more driving axles were used than were actually required to obtain the necessary tractive power and the object of this invention is to obviate these disadvantages and to reduce the difficulties and cost of constructing the locomotive.

According to this invention the steam generator is supported upon one vehicle unit or truck and the steam and internal combustion engines together with a joint power transmission mechanism on a separate truck or vehicle, the two trucks or vehicles being detachably coupled together.

Two constructions of locomotive according to the invention are diagrammatically illustrated by way of example in the accompanying drawings, in which Figure 1 is a side elevation of a locomotive in which one vehicle is used for the steam generator and the other for the steam and internal combustion engine cylinders and their common driving gear, the cylinders of the internal combustion engine being formed as a single group and driving a countershaft through spur wheels.

Figure 2 is a side elevation, and

Figure 3 a plan of an alternative construction in which the internal combustion engine cylinders are formed in two separate groups which drive a countershaft through bevel pinions.

In Figure 1 a truck or vehicle $a$ supports the steam generator $c$ and a vehicle $b$ carries the steam cylinders $d$ and the cylinders $e$ of the internal combustion engine. The steam cylinders actuate directly, and the internal combustion engine cylinders through a spur and bevel wheel gear $h$, $i$ the driving gear constituted by the rods $f$ and the wheels $g$.

In Figures 2 and 3 the same parts are marked with the same reference letters. In this case the internal combustion engine cylinders are separated into two groups $e_1$ and $e_2$ driving from opposite sides a double bevel gear $k_1$, $k_2$, the shaft $m$ of which carries spur wheels driving dummy shafts $l$. Since the shaft $m$ is free to move in an axial direction within the limits of play allowed by the bearings, this arrangement has the advantage that the axial thrust on this shaft is taken up and the tooth pressures on the bevel gears $k_1$ and $k_2$ are balanced.

In both constructions, the steam cylinders are connected to the generator $c$ by means of flexible pipes (not shown in the drawing) which permit independent movement of the vehicles $a$ and $b$. In addition to such a locomotive running easily on curves, owing to its separate unit vehicles the adhesion weight is independent of the level of the fuel and water carried by the steam generator unit and further the driver's cab can be arranged on the vehicle unit which is free from vibrations of the internal combustion engine. The generator truck or unit can moreover be exchanged when the boiler is to be cleaned or repaired without the rest of the locomotive being put out of action.

I claim:

1. A combined steam and internal combustion engine locomotive in which the steam generator is supported upon one vehicle unit or truck and the steam and internal combustion engine cylinders together with their joint power transmission mechanism are carried by a separate truck or vehicle.

2. A combined steam and internal combustion engine locomotive in which the steam generator is supported upon one vehicle unit or truck and the steam and internal combustion engine cylinders together with their driving gear are carried by a separate truck or vehicle.

In testimony whereof I have affixed my signature.

JACOB BUCHLI.